(12) United States Patent
Fujioka et al.

(10) Patent No.: US 10,937,565 B2
(45) Date of Patent: Mar. 2, 2021

(54) WIRE HARNESS

(71) Applicant: SUMITOMO WIRING SYSTEMS, LTD., Yokkaichi (JP)

(72) Inventors: Ryo Fujioka, Yokkaichi (JP); Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/651,795

(22) PCT Filed: Sep. 25, 2018

(86) PCT No.: PCT/JP2018/035318
§ 371 (c)(1),
(2) Date: Mar. 27, 2020

(87) PCT Pub. No.: WO2019/073787
PCT Pub. Date: Apr. 18, 2019

(65) Prior Publication Data
US 2020/0243216 A1 Jul. 30, 2020

(30) Foreign Application Priority Data

Oct. 13, 2017 (JP) .............................. JP2017-199260

(51) Int. Cl.
*H01B 7/00* (2006.01)
*B60R 16/02* (2006.01)
(Continued)

(52) U.S. Cl.
CPC ....... *H01B 7/0045* (2013.01); *B60R 16/0207* (2013.01); *H01R 4/72* (2013.01);
(Continued)

(58) Field of Classification Search
CPC .... H01B 7/0045; B60R 16/0207; H02G 3/04; H02G 15/18; B23K 20/10; H01R 4/72
See application file for complete search history.

(56) References Cited

U.S. PATENT DOCUMENTS 3,573,346 A * 4/1971 Appleby ................ D07B 1/147
174/71 R
4,142,592 A * 3/1979 Brusselmans ...... H02G 15/1806
174/92
(Continued)

FOREIGN PATENT DOCUMENTS

| JP | S62-198820 U | 12/1987 |
| JP | 2017-010692 A | 1/2017 |
| JP | 2017010692 A * | 1/2017 |

OTHER PUBLICATIONS

Nov. 6, 2018 International Search Report issued in International Patent Application No. PCT/JP2018/035318.

*Primary Examiner* — Timothy J Thompson
*Assistant Examiner* — Rhadames Alonzo Miller
(74) *Attorney, Agent, or Firm* — Oliff PLC

(57) ABSTRACT

A wire harness, including: a first conductor including a first connection; a second conductor including a second connection that is connected to the first connection; an adhered member that is disposed on an outer circumference of a connection part between the first connection and the second connection; and an interposed member that is interposed between the connection part and the adhered member, the adhered member being adhered on an outer circumferential surface of the interposed member, wherein the interposed member has rigidity to maintain a certain shape.

9 Claims, 6 Drawing Sheets

(51) Int. Cl.
*H01R 4/72* (2006.01)
*H02G 1/14* (2006.01)
*H02G 3/04* (2006.01)
*H02G 15/18* (2006.01)

(52) U.S. Cl.
CPC ................. *H02G 1/14* (2013.01); *H02G 3/04* (2013.01); *H02G 15/18* (2013.01)

(56) References Cited

U.S. PATENT DOCUMENTS

| | | | | |
|---|---|---|---|---|
| 4,144,404 A * | 3/1979 | De Groef | ............ | B29C 61/0616 174/88 C |
| 4,234,758 A * | 11/1980 | Guzy | ..................... | H02G 15/10 156/49 |
| 4,273,953 A * | 6/1981 | Guzy | ................. | H02G 15/1806 156/49 |
| 4,370,518 A * | 1/1983 | Guzy | ................. | H02G 15/1806 156/49 |
| 4,390,745 A * | 6/1983 | Bottcher | ............. | B29C 61/0616 174/73.1 |
| 4,589,939 A * | 5/1986 | Mohebban | ............. | H02G 15/08 156/49 |
| 4,778,948 A * | 10/1988 | Fitch | ........................ | H01R 4/72 156/49 |
| 4,831,214 A * | 5/1989 | Wilck | ................ | H02G 15/1806 156/49 |
| 4,839,470 A * | 6/1989 | Ventura | .................... | H01R 4/20 156/49 |
| 4,868,967 A * | 9/1989 | Holt | ......................... | F16L 5/02 29/450 |
| 4,879,807 A * | 11/1989 | Roucaute | ................ | H01R 4/72 29/828 |
| 4,938,820 A * | 7/1990 | McMills | ................. | B29C 66/49 156/83 |
| 5,070,597 A * | 12/1991 | Holt | ......................... | F16L 5/02 138/103 |
| 5,188,277 A * | 2/1993 | Girgis | .................... | B23K 20/10 228/111 |
| 5,403,977 A * | 4/1995 | Steptoe | .................... | H01R 4/70 156/49 |
| 5,762,521 A * | 6/1998 | Tanaka | ................. | H01R 12/777 439/492 |
| 5,821,465 A * | 10/1998 | Tanaka | ................... | H01R 12/61 174/88 R |
| 5,907,128 A * | 5/1999 | Lanan | ................... | H01R 4/20 174/74 R |
| 6,265,664 B1 * | 7/2001 | Sakaguchi | ............. | H01R 4/024 174/78 |
| 6,281,431 B1 * | 8/2001 | Cumley | ............... | G02B 6/4446 174/25 G |
| 6,643,926 B2 * | 11/2003 | Sakaguchi | ............. | H01R 4/024 219/56.1 |
| 8,146,491 B2 * | 4/2012 | Schaety | ........... | H01B 13/01281 100/26 |
| 2001/0020540 A1 * | 9/2001 | Sakaguchi | ......... | H01R 43/0228 174/75 C |
| 2003/0141094 A1 * | 7/2003 | Hofmann | ............. | H02G 15/013 174/84 R |
| 2007/0012470 A1 * | 1/2007 | Konnik | ................... | H02G 15/08 174/88 R |
| 2009/0101406 A1 * | 4/2009 | Owen, Sr. | .............. | H02G 15/08 174/72 A |
| 2010/0112858 A1 * | 5/2010 | Takayama | ........... | H01R 9/0518 439/585 |
| 2010/0132976 A1 * | 6/2010 | Tognali | ................... | H02G 15/10 174/113 R |
| 2010/0190389 A1 * | 7/2010 | DeFrance | ............. | H02G 15/08 439/877 |
| 2011/0062218 A1 * | 3/2011 | Ohnuma | ............... | B23K 20/106 228/110.1 |
| 2012/0247828 A1 * | 10/2012 | Kakuta | ............... | B29C 35/0805 174/72 A |
| 2012/0261186 A1 * | 10/2012 | Kakuta | .................... | H01R 4/22 174/75 R |
| 2013/0126234 A1 * | 5/2013 | Ono | ........................ | H02G 15/08 174/75 R |
| 2013/0133944 A1 * | 5/2013 | Teraura | .................... | F16L 39/00 174/72 R |
| 2014/0311797 A1 * | 10/2014 | Numata | ............... | H01R 43/0207 174/75 R |
| 2015/0068800 A1 * | 3/2015 | Yamasaki | .......... | H02G 15/1806 174/72 A |
| 2015/0096786 A1 * | 4/2015 | Takasu | ...................... | B32B 7/00 174/145 |
| 2015/0104983 A1 * | 4/2015 | Kato | .................... | H01R 9/0512 439/874 |
| 2016/0006138 A1 * | 1/2016 | Harms | ................... | B23K 11/0026 174/74 A |
| 2016/0071630 A1 * | 3/2016 | Sugino | ................... | H01R 4/021 174/68.3 |
| 2016/0199928 A1 * | 7/2016 | Mukaiyama | ........... | H02G 15/08 219/605 |
| 2016/0209276 A1 * | 7/2016 | Noli | ........................ | G01K 7/023 |
| 2018/0175596 A1 * | 6/2018 | Sugino | ................... | B60R 16/0215 |
| 2018/0309273 A1 * | 10/2018 | Caimi | .................... | H02G 15/08 |
| 2019/0229436 A1 * | 7/2019 | Michelsen | ........... | H02G 15/117 |
| 2019/0305499 A1 * | 10/2019 | Gustafsson | ............ | H02G 15/08 |
| 2020/0091691 A1 * | 3/2020 | Sato | ........................ | H01R 4/021 |

\* cited by examiner

WIRE HARNESS

BACKGROUND

The present disclosure relates to a wire harness.

JP 2016-58137A discloses a wire harness that is applied to a hybrid vehicle. The wire harness has three conductive wires that are collectively inserted into a shield pipe that is arranged under the floor of the vehicle. Each conductive wire is configured by connecting a single-core electric wire and a stranded electric wire in the length direction. The single-core electric wire has a conductor exposed portion at which a conductor is exposed at a distal end portion, and the conductor exposed portion has a crushed portion that is crushed into a flat plate shape. The stranded electric wire has a strand exposed portion at which strands are exposed at a distal end portion, and the strand exposed portion has a joining block portion formed in a block shape through welding the strands.

The connection parts between the single-core electric wires and the stranded electric wires (the portions where the crushed portions and the joining block portions overlap and are joined) are covered with heat shrinkable tubes serving as adhered members. By the three conductive wires being individually inserted into the heat shrinkable tubes, the conductive wires are electrically insulated from each other.

SUMMARY

The heat shrinkable tubes are substantially in intimate contact with the outer circumferential surfaces of the connection parts in order to ensure the sealability. However, for example, if a heat shrinkable tube that is in intimate contact with an edge of a corner of a crushed portion is damaged, a tear may be formed in the heat shrinkable tube from the damaged portion.

An exemplary aspect of the disclosure provides a wire harness that can prevent a problem such as a tear in an adhered member.

A wire harness of a first aspect of the present disclosure includes: a first conductor including a first connection; a second conductor including a second connection that is connected to the first connection; an adhered member that is disposed on an outer circumference of a connection part between the first connection and the second connection; and an interposed member that is interposed between the connection part and the adhered member, the adhered member being adhered on an outer circumferential surface of the interposed member, and the interposed member has rigidity to maintain a certain shape.

A wire harness of a second aspect of the present disclosure includes: a first conductor including a first connection; a second conductor including a second connection that is connected to the first connection; an adhered member that is disposed on an outer circumference of a connection part between the first connection and the second connection; and an interposed member that is interposed between the connection part and the adhered member, the adhered member being adhered on an outer circumferential surface of the interposed member. The interposed member has a circular cross section that surrounds an entire circumference of the connection part, the interposed member has a shape according to which it is possible to abut on the outer surface of the connection part, and the connection part curves in accordance with a reduction in a diameter of the interposed member.

A wire harness of a third aspect of the present disclosure includes: a first conductor including a first connection; a second conductor including a second connection that is connected to the first connection; an adhered member that is disposed on an outer circumference of a connection part between the first connection and the second connection; and an interposed member that is interposed between the connection part and the adhered member, the adhered member being adhered on an outer circumferential surface of the interposed member. The interposed member has a circular cross section that surrounds an entire circumference of the connection part. The connection part is exposed from a distal end of a covered part and is wider than the covered part, and a diameter of the interposed member gradually decreases from a connection part side to a covered part side.

In the wire harness of the first aspect of the present disclosure, because the interposed member is interposed between the adhered member and the connection part, the adhered member can be prevented from directly coming into contact with the connection part. As a result, it is possible to prevent the adhered member from being torn due to interference with an edge of the corner of the connection part or the like.

In the wire harness of the second aspect of the present disclosure, because the interposed member is interposed between the adhered member and the connection part, the adhered member can be prevented from directly coming into contact with the connection part. As a result, it is possible to prevent the adhered member from being torn due to interference with an edge of the corner of the connection part or the like.

Also, the interposed member has a circular cross section that surrounds the entire circumference of the connection part. With this configuration, because no edge is formed on the outer circumferential surface of the interposed member, damage to the adhered member adhered to the outer circumferential surface of the interposed member can be more reliably prevented. The circular cross section is not limited to a true circular cross section, and may also be an irregular cross section other than a true circular shape, such as an elliptical cross section, an oval cross section, and a flat circular cross section.

Also, the interposed member has a shape according to which it is possible to abut on the outer surface of the connection part. If the interposed member is interposed between the adhered member and the connection part, there is a concern that the wire harness will become larger in the radial direction. However, according to the above configuration, it is possible to suppress an increase in the size of the wire harness in the radial direction due to the interposed member.

Also, the connection part curves in accordance with a reduction in the diameter of the interposed member. With this configuration, the increase of the dimension of the wire harness in the radial direction can be suppressed more preferably.

In the wire harness of the third aspect of the present disclosure, because the interposed member is interposed between the adhered member and the connection part, the adhered member can be prevented from directly coming into contact with the connection part. As a result, it is possible to prevent the adhered member from being torn due to interference with an edge of the corner of the connection part or the like.

The interposed member has a circular cross section that surrounds the entire circumference of the connection part. With this configuration, because no edge is formed on the outer circumferential surface of the interposed member, damage to the adhered member adhered to the outer circumferential surface of the interposed member can be more reliably prevented. The circular cross section is not limited to a true circular cross section, and may also be an irregular cross section other than a true circular shape, such as an elliptical cross section, an oval cross section, and a flat circular cross section.

The connection part is exposed from the distal end of a covered part and is wider than the covered part, and the diameter of the interposed member gradually decreases from the connection part side to the covered part side. With this configuration, the adhered member does not come into contact with a level difference that may be formed between the connection part and the covered part. Also, because the diameter of the interposed member gradually decreases toward the covered part, the adhered member is not excessively pulled outward by the interposed member. As a result, it is possible to more reliably prevent the adhered member from being damaged.

DETAILED DESCRIPTION OF EMBODIMENTS

Preferred embodiments of the present disclosure are described below.

It is preferable that the first conductive member is a single-core electric wire, and a plate-shaped conductor portion of the single-core electric wire forms the connection part. Because edges are easily formed at the corners of the plate-shaped conductor portion of the single-core electric wire, there is a great advantage in applying the present disclosure to prevent the adhered member from coming into contact with the plate-shaped conductor portion.

It is preferable that the interposed member has a circular cross section that surrounds the entire circumference of the connection part. With this configuration, because no edge is formed on the outer circumferential surface of the interposed member, damage to the adhered member adhered to the outer circumferential surface of the interposed member can be more reliably prevented. The circular cross section is not limited to a true circular cross section, and may also be an irregular cross section other than a true circular shape, such as an elliptical cross section, an oval cross section, and a flat circular cross section.

It is preferable that the interposed member has a shape according to which it is possible to abut on the outer surface of the connection part. If the interposed member is interposed between the adhered member and the connection part, there is a concern that the wire harness will become larger in the radial direction. However, according to the above configuration, it is possible to suppress an increase of the wire harness in the radial direction due to the interposed member.

It is preferable that the outer circumferential corner of the opening edge of the interposed member has a curved surface shape. With this configuration, even if the adhered member comes into contact with the outer circumferential corner of the opening edge of the interposed member, the adhered member is not likely to be damaged. As a result, it is possible to more reliably prevent a defect such as a tear in the adhered member.

First Embodiment

Figure 1:
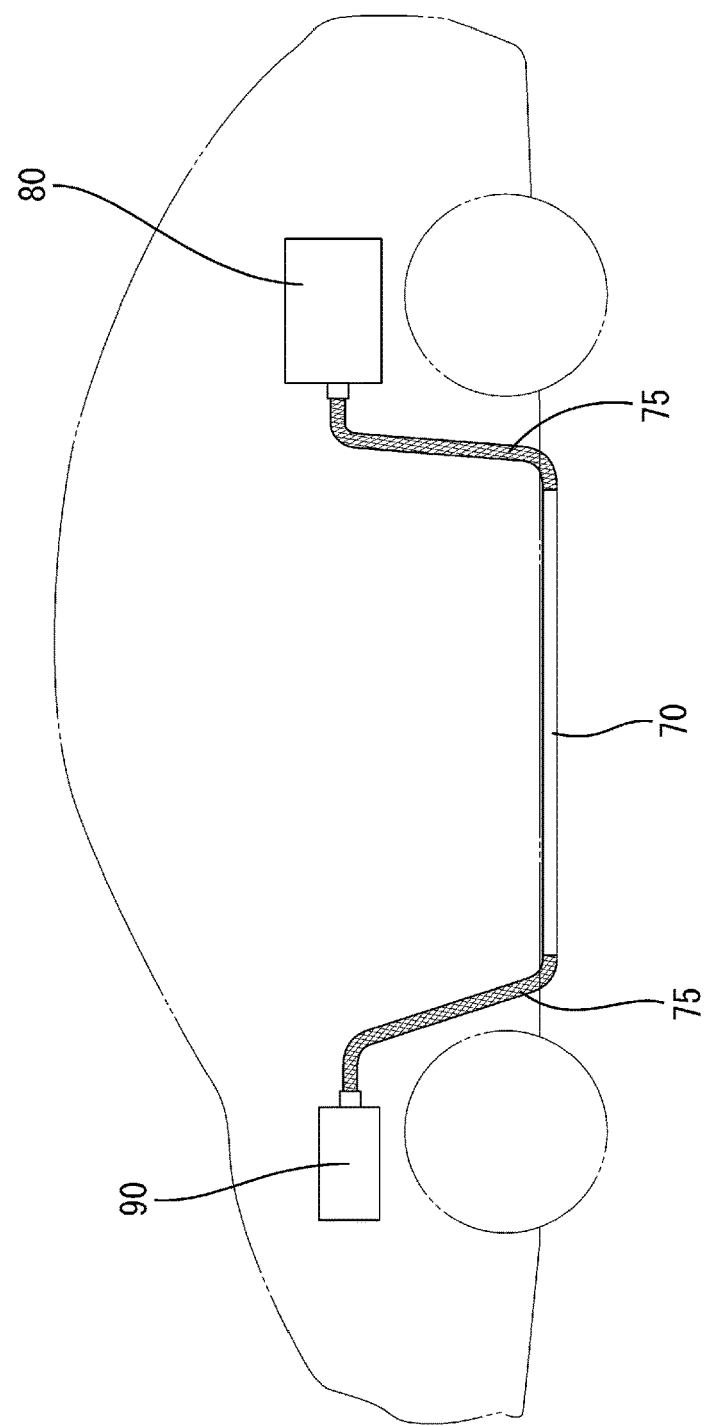
FIG. 1 is a schematic view showing a routing state of a wire harness of a hybrid vehicle in a first embodiment of the present disclosure.

Hereinafter, a first embodiment will be described with reference to the drawings. The wire harness of the first embodiment is applied, for example, to a hybrid vehicle, and as shown in FIG. 1, is routed between a battery 80 installed at the rear of the vehicle and an inverter 90 installed in an engine room at the front of the vehicle. Although this wire harness includes a plurality of conductive paths, only one conductive path 10 of the conductive paths is shown in FIGS. 2 to 7.

Figure 2:
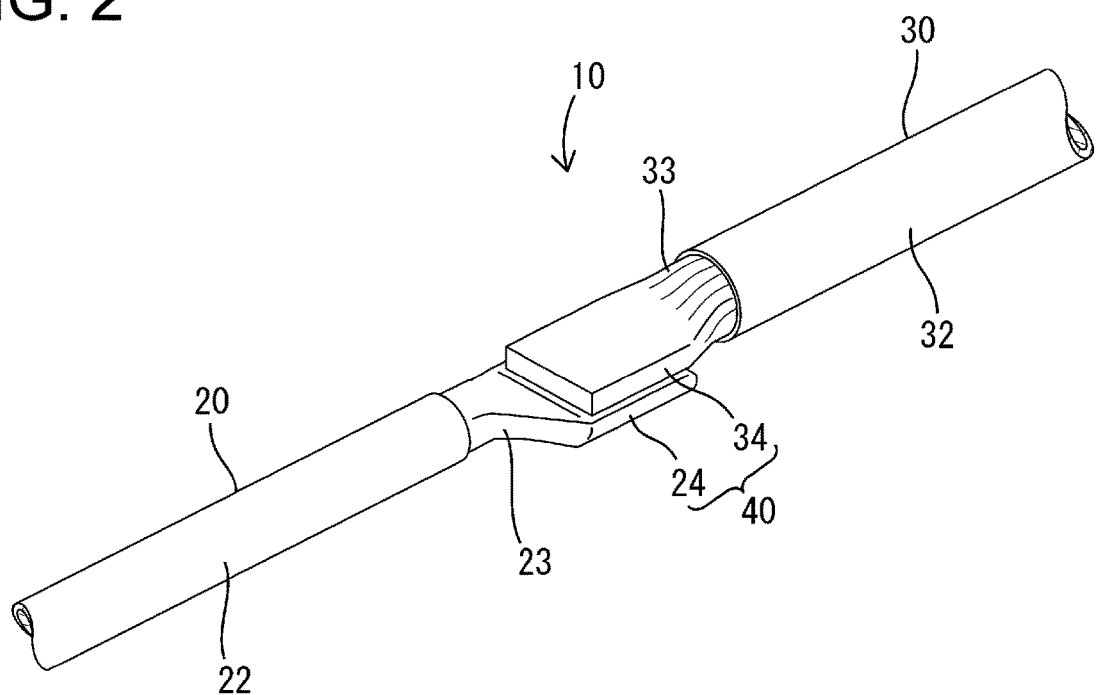
FIG. 2 is a perspective view showing a connection part between a single-core electric wire and a stranded electric wire.
Figure 3:
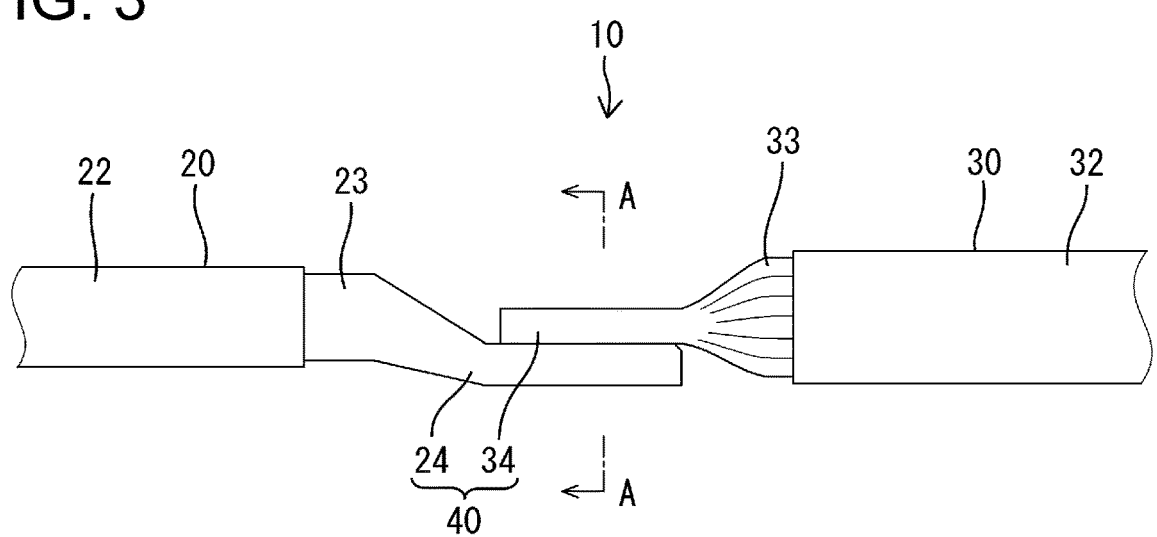
FIG. 3 is a side view showing the connection part between the single-core electric wire and the stranded electric wire.

As shown in FIGS. 2 and 3, the conductive path 10 includes a single-core electric wire 20 serving as a first conductive member and a stranded electric wire 30 serving as a second conductive member. The single-core electric wire 20 and the stranded electric wire 30 are alternately arranged in the length direction (the routing direction) of the wire harness, and are connected to each other via a connection part 40 that will be described later. The single-core electric wire 20 is mainly inserted into a shield pipe 70 (see FIG. 1) that is installed under the floor of the vehicle, and the stranded electric wires 30 are inserted to meshed braided members 75 (see FIG. 1) that are connected to the ends of the shield pipe 70 consisting of a metal pipe or a composite pipe composed of metal and resin, and that are drawn into the front of the vehicle and the rear of the vehicle. The connection parts 40 are provided in the braided members 75.

Figure 7:
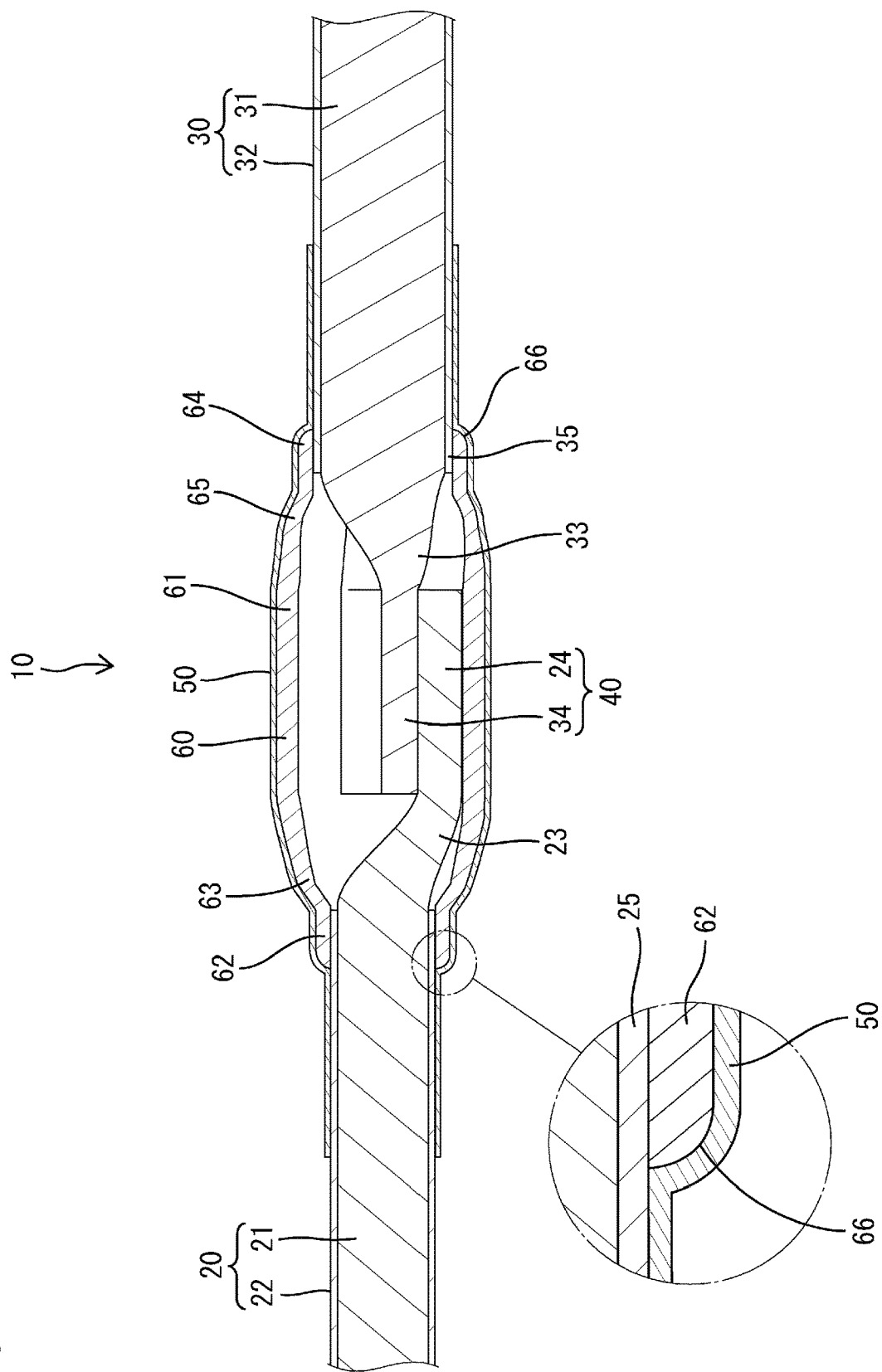
FIG. 7 is a cross-sectional view showing a state in which the interposed member is interposed between the connection part and an adhered member, and the adhered member is adhered on the outer circumferential surface of the interposed member.

As shown in FIG. 7, the single-core electric wire 20 has a configuration in which one conductor 21 is surrounded by a covering 22 made of an insulating resin. The conductor 21 is made of, for example, aluminum or an aluminum alloy, and is configured as a rod having a circular cross section. The conductor 21 is exposed at the distal end of the single-core electric wire 20 by removing the covering 22, and the exposed conductor portion constitutes a conductor exposed portion 23. In the conductor exposed portion 23, a plate-shaped conductor portion 24 serving as a first connection portion is formed by crushing.

As shown in FIGS. 3 and 7, the lower surface of the plate-shaped conductor portion 24 is disposed below the lower surface of the covering 22, and the plate-shaped conductor portion 24 extends forward and in the width direction (the plate width direction) by crushing. As a result, as shown in FIG. 2, the width dimension of the plate-shaped conductor portion 24 is larger than the width dimension (outer diameter dimension) of the covering 22.

As shown in FIG. 7, the stranded electric wire 30 is composed of a plurality of strands 31 (in FIG. 7, the strands 31 are shown integrally) constituting a core wire and coverings 32 that are made of an insulating resin and that surround respective strands 31. The stranded electric wire 30 has a larger diameter than the single-core electric wire 20 overall. Each strand 31 is made of, for example, aluminum or an aluminum alloy, and is preferably made of the same material as the conductor 21 of the single-core electric wire 20. The strands 31 are exposed at the distal end of the stranded electric wire 30 by removing the covering 32, and the exposed strands 31 constitute a strand exposed portion 33. In the strand exposed portion 33, a block conductor portion 34 is formed as a second connection portion having a substantially flat rectangular block shape by welding the strands 31.

The block conductor portion 34 is formed below the axial center of the stranded electric wire 30, and is placed so as to overlap the plate-shaped conductor portion 24 in the thickness direction when the stranded electric wire 30 and the single-core electric wire 20 are connected. The block conductor portion 34 has a form slightly expanding forward and in the width direction by welding. As a result, as shown in FIG. 2, the width dimension of the block conductor portion 34 is slightly smaller than the width dimension of the plate-shaped conductor portion 24, but is larger than the width dimension (the outer diameter dimension) of the covering 32.

The block conductor portion 34 and the plate-shaped conductor portion 24 face each other are connected to each other via joining means such as ultrasonic welding to form a connection part 40. As shown in FIG. 7, a heat shrinkable tube 50 serving as an adhered member is disposed on the outer circumference of the connection part 40. Then, an interposed member 60 is interposed between the connection part 40 and the heat shrinkable tube 50. In the first embodiment, the heat shrinkable tube 50 is kept in a non-contact state with the connection part 40 due to the interposition of the interposed member 60.

The interposed member 60 is made of metal such as aluminum, an aluminum alloy, iron, and an iron alloy (including a stainless steel), has a cylindrical shape having a circular cross section (including a ring shape and a tubular shape), and surrounds the entire circumference of a region extending from the connection part 40 to the respective covered end portions 25 and 35 of the single-core electric wire 20 and the stranded electric wire 30. As shown in FIG. 7, the interposed member 60 can abut on the plate-shaped conductor portion 24 of the connection part 40 and the outer circumferential surfaces of the covered end portions 25 and 35 by having a shape (diameter reduced shape) reduced in diameter from the time of molding.

Figure 5:
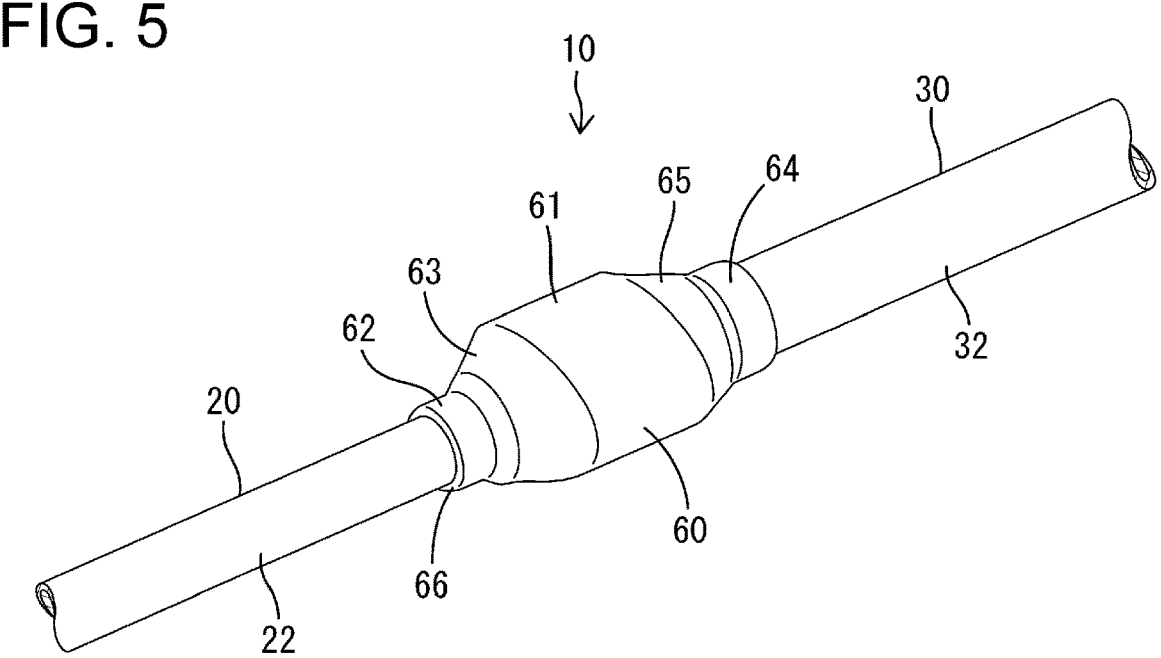
FIG. 5 is a perspective view showing a state in which an interposed member is disposed so as to cover the connection part.

More specifically, as shown in FIGS. 5 and 7, the interposed member 60 is composed of a main body 61 that is located at the center in the length direction and has a widened cross-sectional shape (see FIG. 6), a first end portion 62 that is located on one side in the length direction (on the side of the covering 22 of the single-core electric wire 20) and has a substantially true circular cross section, a tapered first transition portion 63 whose diameter gradually decreases from the main body 61 to the first end portion 62, a second end portion 64 that is located on the other side in the length direction (on the side of the covering 32 of the stranded electric wire 30) and has a substantially true circular cross section, and a tapered second transition portion 65 whose diameter gradually decreases from the main body 61 to the second end portion 64. The interposed member 60 has a form in which the first end portion 62, the first transition portion 63, the main body 61, the second transition portion 65, and the second end portion 64 are sequentially continuous in the length direction.

Figure 6:
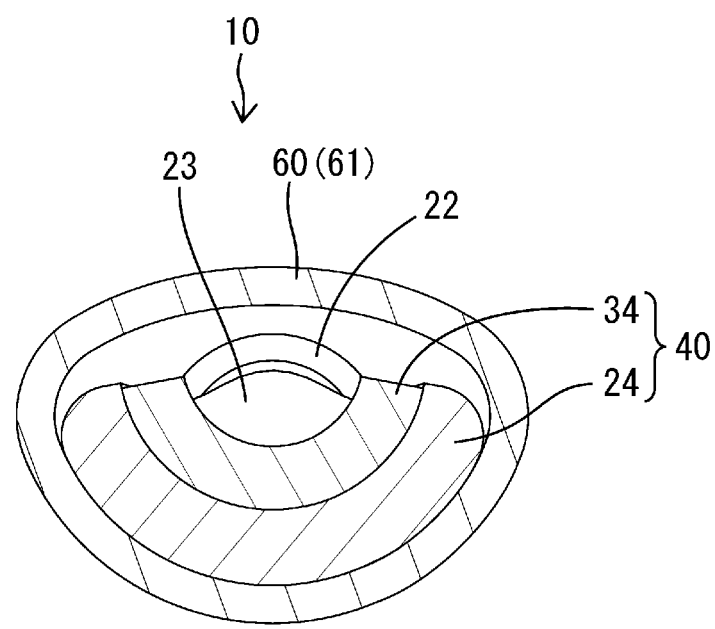
FIG. 6 is a cross-sectional view showing a state in which the diameter of the interposed member is reduced, and the connection part is curved.

As shown in FIG. 6, the approximate lower half portion of the main body 61 is curved in a substantially U-shaped cross section along the curved plate-shaped conductor portion 24, and is in intimate contact with the curved outer surface of the plate-shaped conductor portion 24. On the other hand, the approximate upper half portion of the main body 61 spans between both ends in the circumferential direction of the approximate lower half portion, and is kept in a non-contact state with the connection part 40 such as the block conductor portion 34.

The first end portion 62 covers the entire circumference of the covering 22 of the single-core electric wire 20, and is disposed so as to abut along the covering 22. As shown in FIG. 7, the outer circumferential corner of the distal end (opening end) of the first end portion 62 is a curved surface portion 66 that is rounded into a curved surface. The curved surface portion 66 is provided at the distal end of the first end portion 62 and is chamfered in a round shape over the entire circumference.

As shown in FIG. 7, the first transition portion 63 is inclined at a relatively gentle inclination angle from the main body 61 to an intermediate portion toward the first end portion 62, and is inclined at a relatively steep inclination angle from the intermediate portion to the first end portion 62. The first transition portion 63 covers a portion of the conductor exposed portion 23 other than the plate-shaped conductor portion 24, and is kept substantially in a non-contact state with this portion. The portion where the first transition portion 63 is connected to the first end portion 62 is substantially at the same position as the distal end of the covering 22 of the single-core electric wire 20.

Similarly, the second end portion 64 covers the entire circumference of the covering 32 of the stranded electric wire 30, and is disposed so as to abut along the covering 32. The outer circumferential corner of the distal end (opening end) of the second end portion 64 is a curved surface portion 66 that is rounded into a curved surface. The curved surface portion 66 is provided at the distal end of the second end portion 64 and is chamfered in a round shape over the entire circumference.

The second transition portion 65 is inclined at a relatively gentle inclination angle from the main body 61 to an intermediate portion toward the second end portion 64, and is inclined at a relatively steep inclination angle from the intermediate portion to the second end portion 64. The second transition portion 65 covers a portion of the strand exposed portion 33 other than the block conductor portion 34, and is kept substantially in a non-contact state with this portion. The portion where the second transition portion 65 is connected to the second end portion 64 is substantially at the same position as the distal end of the covering 32 of the stranded electric wire 30.

The first end portion 62 and the second end portion 64 have substantially the same length. On the other hand, regarding the diameter dimension, because the covering 32 of the stranded electric wire 30 is larger in diameter than the covering 22 of the single-core electric wire 20, the second end portion 64 is formed to be larger in diameter than the first end portion 62.

The heat shrinkable tube 50 is made of, for example, a cylindrical film made of a synthetic resin, and contracts and adheres to the entire outer circumferential surface of the interposed member 60 by heating. As shown in FIG. 7, the conductive path 10 is inserted into the heat shrinkable tube 50 such that the heat shrinkable tube 50 spans between the covered end portion 25 of the single-core electric wire 20 and the covered end portion 35 of the stranded electric wire 30, and thus electrical insulation between the conductive paths 10 is ensured. The heat shrinkable tube 50 straddles the covered end portion 25 of the single-core electric wire 20 and the first end portion 62 of the interposed member 60, and is in intimate contact with the respective outer circumference surfaces. The heat shrinkable tube 50 also straddles the covered end portion 35 of the stranded electric wire 30 and the second end portion 64 of the interposed member 60, and is in intimate contact with the respective outer circumference surfaces. With this configuration, the sealability of the connection part 40 is ensured.

Next, the operation and effect of the first embodiment will be described.

Figure 4:
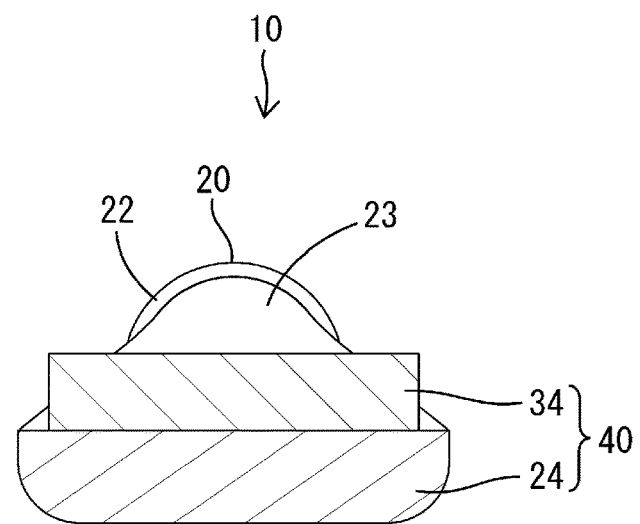
FIG. 4 is a cross-sectional view taken along line A-A of FIG. 3.

As shown in FIGS. 2 to 4, in the state where the single-core electric wire 20 and the stranded electric wire 30 face each other coaxially, the block conductor portion 34 is placed on and overlaps the upper surface of the plate-shaped conductor portion 24. Then, the plate-shaped conductor portion 24 and the block conductor portion 34 are joined by an ultrasonic joining machine, and the connection part 40 that is electrically connected through metal-to-metal joining performed based on ultrasonic welding is obtained. Note that as shown in FIGS. 2 and 3, before the diameter of the interposed member 60 is reduced, both the plate-shaped conductor portion 24 and the block conductor portion 34 are flat along the front-rear direction and the width direction.

Then, the interposed member 60, whose diameter has not yet been reduced and that has been inserted into the conductive path 10 in advance, is moved to the position covering the outer circumference of the connection part 40. Although not shown in the drawing, the interposed member 60 whose diameter has not yet been reduced is a cylindrical body (almost the same diameter over the entire length) that extends in the length direction, with no distinction between the first end portion 62, the first transition portion 63, the main body 61, the second transition portion 65, and the second end portion 64.

Subsequently, the interposed member 60 is compressed and deformed radially inward by a compression device (a swagging device, a press device, or the like). As a result, the interposed member 60 extends in the length direction, and the first end portion 62, the first transition portion 63, the main body 61, the second transition portion 65, and the second end portion 64 are each formed into the shape described above. At the same time, the curved surface portions 66 are formed at the respective distal ends of the first end portion 62 and the second end portion 64. The curved surface portions 66 may also be separately formed by pressing, without using a compression device.

As the diameter of interposed member 60 is reduced as described above, the connection part 40 inside the main body 61 is bent and deformed by receiving an inward force from the main body 61. As a result, as shown in FIG. 6, the plate-shaped conductor portion 24 is curved in a substantially U-shaped cross section along the curved inner surface of the approximate lower half portion of the main body 61, and the block conductor portion 34 is curved in a substantially U-shaped cross section along the curved inner surface of the plate-shaped conductor portion 24. In this manner, the connection part 40 is efficiently arranged in the inner space of the main body 61 that has been narrowed by compression.

Then, the heat shrinkable tube 50 that has not yet been subjected to the heat treatment and has been previously inserted into the conductive path 10 is moved to the position covering the outer circumference of the interposed member 60. In this state, the heat shrinkable tube 50 is heated to bring the heat shrinkable tube 50 into intimate contact with the outer circumferential surface of the region extending from the interposed member 60 to the covered end portions 25 and 35, as shown in FIG. 7.

In the description above, because the outer circumferential surface of the interposed member 60 is curved overall, a part of the heat shrinkable tube 50 is not excessively pulled in a state where the heat shrinkable tube 50 is in intimate contact with the outer circumferential surface of the interposed member 60. As a result, satisfactory adhesion can be obtained. In particular, because the outer circumferential corners of the opening ends of the interposed member 60 are also curved surface portions 66, the stepped shape (including square and hook shapes) is eliminated from the entire area of the interposed member 60 with which the heat shrinkable tube 50 is in intimate contact, and the adhesion of the heat shrinkable tube 50 is further improved.

As described above, according to the first embodiment, the interposed member 60 is interposed between the connection part 40 and the heat shrinkable tube 50 so that the heat shrinkable tube 50 does not come into direct contact with the connection part 40. Accordingly, for example, the heat shrinkable tube 50 does not interfere with the corners of the plate-shaped conductor portion 24 and the block conductor portion 34 constituting the connection part 40, and it is possible to prevent the heat shrinkable tube 50 from being damaged and torn. As a result, the connection part 40 is properly protected by the heat shrinkable tube 50.

In the description above, because the interposed member 60 has a circular cross section surrounding the entire circumference of the connection part 40, the heat shrinkable tube 50 can be more reliably prevented from being damaged.

Also, because the interposed member 60 has a reduced diameter so as to be able to abut on the outer surface of the plate-shaped conductor portion 24 of the connection part 40, it is possible to suppress the conductive path 10 from increasing in the radial direction. As a result, an increase in the diameter of the braided member 75 is also suppressed.

Furthermore, because the plate-shaped conductor portion 24 and the block conductor portion 34 constituting the connection part 40 are also curved in accordance with the diameter reduction of the interposed member 60, the diameter of the conductive path 10 can be further reduced.

In addition, the plate-shaped conductor portion 24 and the block conductor portion 34 constituting the connection part 40 are respectively wider than the coverings 22 and 32, and the interposed member 60 includes the first transition portion 63 and the second transition portion 65 whose diameters gradually decrease from the connection part 40 to the covering 22 and 32, thus the heat shrinkable tube 50 does not interfere with the level differences formed between the connection part 40 and the coverings 22 and 32. Also, because the heat shrinkable tube 50 is in intimate contact with the first transition portion 63 and the second transition portion 65 whose diameters gradually decrease toward the coverings 22 and 32, the heat shrinkable tube 50 is not excessively pulled outward. As a result, it is possible to more reliably prevent the heat shrinkable tube 50 from being damaged due to the intimate contact with the interposed member 60.

Other Embodiments

Hereinafter, other embodiments will be briefly described.

(1) Both the first conductive member and the second conductive member may also be single-core electric wires. Conversely, both the first conductive member and the second conductive member may also be stranded electric wires. Also, contrary to the first embodiment, the first conductive member may also be a stranded electric wire, and the second conductive member may also be a single-core electric wire. Furthermore, at least one of the first conductive member and the second conductive member may also be formed of a conductor, such as a bus bar, other than a covered electric wire.

(2) The present disclosure can be applied to a wire harness that is not inserted into a shield pipe or a braided member and has no shield function.

(3) An adhesive tape may also be wound around the outer circumferential surface of the interposed member, instead of a heat shrinkable tube. Also, a rubber tube may also be fitted on the outer circumferential surface of the interposed member, instead of a heat shrinkable tube. The adhered member only needs to be adhered to the outer circumferential surface of the interposed member, and does not necessarily have to be in intimate contact with the outer circumferential surface of the interposed member.

(4) The adhered member may also be a member that partially comes into contact with a region other than a damage-prone portion such as a corner of the connection part.

(5) In the first embodiment, the configuration may also be such that the approximate upper half portion of the main body of the interposed member is in contact with the curved block conductor portion.

(6) In the first embodiment, the block conductor portion may also maintain a flat shape, without being curved. Also, both the plate-shaped conductor portion and the block conductor portion may also maintain a flat shape, without being curved.

(7) In the first embodiment, any of the first end portion, the first transition portion, the second transition portion, and the second end portion of the interposed member may also be omitted. For example, the second transition portion may be omitted, and the interposed member may also be continuous with substantially the same diameter in the length direction from the main body to the second end portion. Also, the interposed member may also be composed of only the main body so as to cover only the connection part.

(8) The interposed member may also be in a form that covers only a damage-prone portion such as a corner of the connection part. In that case, the interposed member does not have to be in a cylindrical shape with the entire circumference closed.

(9) The interposed member need only have rigidity to maintain a certain shape, and may also be made of a synthetic resin, for example.

Figure 8:
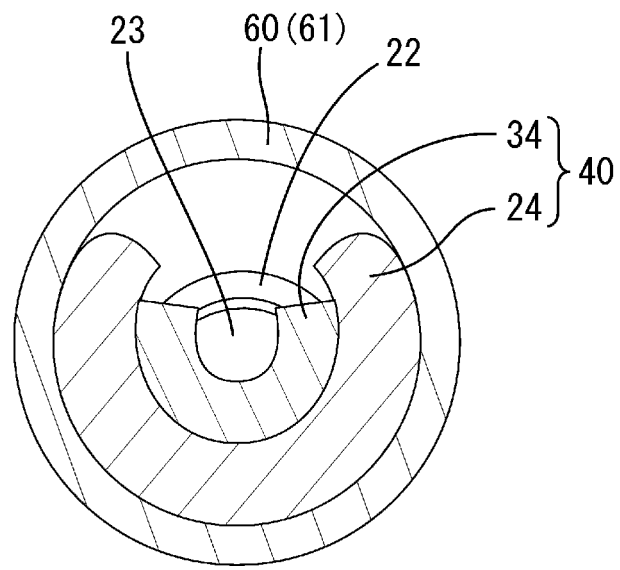
FIG. 8 is a diagram corresponding to FIG. 6 in one aspect of another embodiment.
Figure 9:
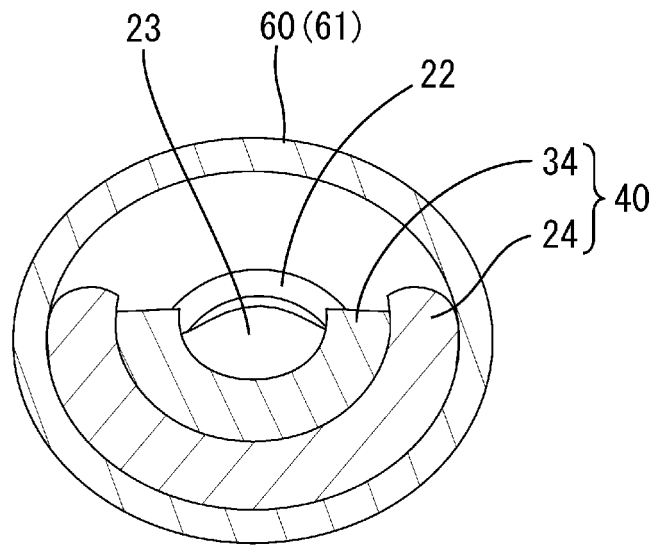
FIG. 9 is a diagram corresponding to FIG. 6 in another aspect of the other embodiment.

(10) In the case of the first embodiment, as shown in FIG. 6, the main body 61 of the interposed member 60 after diameter reduction has a widened cross-sectional shape. However, in the case of the present disclosure, as shown in FIG. 8, the main body 61 of the interposed member 60 after diameter reduction may also have a substantially true circular cross-sectional shape. Alternatively, as shown in FIG. 9, the main body 61 of the interposed member 60 after diameter reduction may also have a substantially elliptical cross-sectional shape.

The invention claimed is:
1. A wire harness, comprising:
a first conductor including a first connection;
a second conductor including a second connection that is connected to the first connection;
an adhered member that is disposed on an outer circumference of a connection part between the first connection and the second connection; and
an interposed member that
is separate and distinct from the connection part,
is interposed between the connection part and the adhered member, and
covers the connection part in a non-contact state,
the adhered member being adhered on an outer circumferential surface of the interposed member,
wherein the interposed member has rigidity to maintain a certain shape.
2. The wire harness according to claim 1,
wherein the interposed member is made of metal.
3. The wire harness according to claim 1,
wherein the first conductor is a single-core electric wire, and a plate-shaped conductor of the single-core electric wire forms the connection part.
4. The wire harness according to claim 1,
wherein the interposed member has a circular cross section that surrounds an entire circumference of the connection part.
5. The wire harness according to claim 4,
wherein the interposed member has a shape according to which it is possible to abut on an outer surface of the connection part.
6. The wire harness according to claim 4,
wherein an outer circumferential corner of an opening edge of the interposed member has a curved surface shape.
7. The wire harness according to claim 1,
wherein the interposed member covers an upper portion of the connection part in a non-contact state and covers a lower portion of the connection part in a direct contact state.
8. A wire harness, comprising:
a first conductor including a first connection;
a second conductor including a second connection that is connected to the first connection;
an adhered member that is disposed on an outer circumference of a connection part between the first connection and the second connection; and
an interposed member that
is separate and distinct from the connection part,
is interposed between the connection part and the adhered member, and
covers the connection part in a non-contact state,
the adhered member being adhered on an outer circumferential surface of the interposed member, wherein:
the interposed member has a circular cross section that surrounds an entire circumference of the connection part,
the interposed member has a shape according to which it is possible to abut on an outer surface of the connection part, and
the connection part curves in accordance with a reduction in a diameter of the interposed member.
9. A wire harness, comprising:
a first conductor including a first connection;
a second conductor including a second connection that is connected to the first connection;
an adhered member that is disposed on an outer circumference of a connection part between the first connection and the second connection; and
an interposed member that is separate and distinct from the connection part,
is interposed between the connection part and the adhered member, and
covers the connection part in a non-contact state,
the adhered member being adhered on an outer circumferential surface of the interposed member, wherein:
the interposed member has a circular cross section that surrounds an entire circumference of the connection part, and
the connection part is exposed from a distal end of a covered part and is wider than the covered part, and a diameter of the interposed member gradually decreases from a connection part side to a covered part side.

* * * * *